United States Patent [19]
Laudise

[11] 3,816,366
[45] June 11, 1974

[54] ACRYLIC ADDUCTS OF AMINO-AMIDES OF MONOMERIC FATTY COMPOUNDS

[75] Inventor: Michael A. Laudise, Spring Lake Park, Minn.

[73] Assignee: General Mills Chemicals, Inc., Minneapolis, Minn.

[22] Filed: Dec. 4, 1972

[21] Appl. No.: 312,069

[52] U.S. Cl......... 260/23 EP, 260/18 N, 260/18 PN, 260/23 CP, 260/404.5, 260/830 P, 260/837 R
[51] Int. Cl............................................. C08g 45/12
[58] Field of Search ......... 260/830 P, 18 N, 857 U, 260/23 CP, 18 PN, 837 R, 404.5

[56] References Cited
UNITED STATES PATENTS

| | | | |
|---|---|---|---|
| 2,952,647 | 9/1960 | Swann et al. | 260/18 |
| 3,001,960 | 9/1961 | Hovey | 260/830 |
| 3,062,773 | 11/1962 | Rogier | 260/830 |
| 3,127,365 | 3/1964 | Floyd | 260/857 |
| 3,138,566 | 6/1964 | Arnold | 260/18 |

FOREIGN PATENTS OR APPLICATIONS

| | | | |
|---|---|---|---|
| 618,508 | 4/1961 | Canada | 260/857 |
| 636,293 | 2/1962 | Canada | 260/18 |
| 659,406 | 3/1963 | Canada | 260/18 |
| 1,165,522 | 10/1969 | Great Britain | 260/857 |
| 810,348 | 3/1959 | Great Britain | 260/830 |

Primary Examiner—Donald E. Czaja
Assistant Examiner—Eugene C. Rzucidlo
Attorney, Agent, or Firm—Anthony A. Juettner; Patrick J. Span

[57] ABSTRACT

Adducts of an active acrylic compound and an amino-amide of monomeric fatty compounds which is a new curing agent for epoxy resins, particularly suitable for curing such epoxy resins in aqueous systems. The agents find utility in coatings systems such as paints but are useful in any area where thermoset epoxy systems find utility.

8 Claims, No Drawings

ACRYLIC ADDUCTS OF AMINO-AMIDES OF MONOMERIC FATTY COMPOUNDS

This invention relates to new curing agents for epoxy resins which are particularly suitable or adapted for curing such epoxy resins in aqueous systems. The curing agents are adducts or reaction products of an active acrylic compound and certain amino-amides of monomeric fatty compounds. When used in curing epoxy resins in aqueous systems, the curing agents provide for improvement in either flow and leveling, dry time, pot life, chemical resistance and/or amine carbonation. The agents find utility particularly in coating systems such as paints, but are useful in any areas where thermoset epoxy systems find utility, such as, adhesives or binders, fillers, etc.

BACKGROUND OF THE INVENTION

Thermosetting epoxy resin-amine curing agent systems have been known for some time. Amino-polyamide resins of polymeric fat acids are one type of known curing agent as can be seen from U.S. Pat. No. 2,379,413. The use of such resins for curing epoxy resins in aqueous systems is shown in U.S. Pat. No. 2,899,397. Such systems had some inherent disadvantages. More recently, monoepoxide adducts of such resins were disclosed as providing for improved properties in aqueous systems as shown in Canadian Patent No. 875,618. In U.S. Pat. No. 3,127,365 are shown acrylic adducts of such polymeric fat acid polyamides using relatively large amounts of acrylic compound, which when seponified is said to provide a water soluble polymer. When used in curing epoxy resins, the compounds are used in 100 percent solid coatings and not in aqueous systems. Attempts to use such products in aqueous systems with epoxy resin were not particularly satisfactory.

Amino-amides of monomeric fatty compounds are also known as curing agents for epoxy resins. These are generally employed in 100 percent solid systems or in organic solvent systems. Such amino-amides, of particularly low viscosity, from epoxidized fatty acids may be seen from U.S. Pat. No. 3,138,566. Higher viscosity similar products can be seen in Canadian Patent No. 616,324. These are also disclosed in Canadian Patent No. 659,406. In this latter patent there are also disclosed the amino-amides of unmodified fatty acids. Another group of amino-amides of fatty compounds are those disclosed in U.S. Pat. No. 3,062,773. In this case, the monomeric fatty compound is a fatty acid which has an additional carboxyl group thereon formed by the addition of carbon monoxide to the double bond unsaturation in the fatty acid. Since the acid is difunctional, the resulting amino-amide may contain more than one amide group and accordingly may be referred to as an amino-polyamide. In the foregoing references the products may contain, in addition to the amine and amide group, some imidazoline groups or other imino linked forms. None of the products are disclosed for use in aqueous systems and when used therein without modification are relatively unsatisfactory.

In view of recent ecological history, aqueous systems for curing epoxy resins have assumed greater importance in order to avoid the use of organic solvents which may result in air pollution to some degree. Attempts to use known curing agents in aqueous systems have been unsatisfactory to a large extent, as deterioration of the properties of the cured product results.

SUMMARY OF THE INVENTION

It has now been found however, that satisfactory results may be achieved from aqueous systems by the use of a curing agent which is an adduct of an active acrylic compound and an amino-amide of a monomeric fatty compound. The active acrylic compound is an $\alpha, \beta$ unsaturated compound, either an acid, ester or anhydride. The adduct is formed by reacting the acrylic compound with the amino-amide for a time sufficient to react the acrylic compound, with the amino-amide. The adduction is generally conducted in the presence of water at elevated temperatures.

The starting amino-amides of the monomeric fatty compounds for adduction are known compounds as noted earlier hereinabove. These are prepared by reacting a polyamine with a monomeric fatty compound under conventional amidification conditions using an excess of amine to provide relatively high amine number products.

The curing agents may then be employed to cure epoxy resins in aqueous systems, such as aqueous paint or other coating formulations. The resulting coatings will show relatively good gloss characteristics and chemical resistance. The formulations possess good flow and leveling, dry time and pot life. In general, amine curing agents for epoxy resins tend to react with carbon dioxide to form a surface haze generally referred to as amine carbonate formation and water appears to be a catalyst for carbonate formation. The curing agents of the present invention tend to show a reduction of amine carbonation.

DETAILED DESCRIPTION AND PREFERRED EMBODIMENTS

As indicated, the curing agent of this invention is the adduct of an active acrylic compound and an amino-amide of a monomeric fatty compound. An active acrylic compound is one containing $\alpha, \beta$ unsaturation and herein is preferably a monocarboxylic or dicarboxylic compound selected from the acids, esters or anhydride thereof. Thus the preferred active acrylic acids or esters herein may ideally be represented by the formula

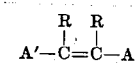

where R is hydrogen of an alkyl group, (preferably contains one to eight carbon atoms), A is COOR and A' is either R or A. The R groups may be the same but generally will be different with one or more of the R groups attached to the C=C generally being hydrogen. Illustrations of such preferred compounds are acrylic acid, methacrylic acid, methyl acrylate, methyl methacrylate, crotonic acid, methyl crotonate, butyl acrylate, fumaric and maleic acids or their esters, such as dioctyl maleate, and the anhydrides such as maleic anhydride.

The adduct is formed by reacting the active acrylic compound in an amount of about 0.04 to 0.4 moles per of amine in said amino-amide, By and preferably 0.1 to 0.3 moles. By equivalent of amine in said amino-amide is meant the equivalent weight of amino-amide, or the weight of amino-amide to provide one amine group for reaction. This may be determined from the amine number of the amino-amide by dividing 56100 by the amine number. Thus:

Equivalent weight = 56100/Amine No.

The amine number is the number of milligrams of KOH equivalent for free amine groups in 1 gram sample of resin.

The reaction of the active acrylic compound and the amino-amide may be conducted at room temperature or elevated temperature. At room temperature the time for reaction is unduly long and it is accordingly preferred that elevated temperatures of 50° C. and above be employed. It is, of course, preferable not to exceed the boiling point or decomposition point of any of the materials present during the reaction. Where the reaction is conducted in the presence of water, it is therefore desirable that the reaction temperature not exceed 100°C. It is preferred that the reaction be conducted in the presence of water rather than unreactive organic solvents, particularly since the present invention is particularly adapted for curing of epoxy resins in aqueous systems thereby avoiding the use of organic solvents. The reaction of the acrylic compound and the amino-amide may however be conducted in the presence of organic solvents. If this is done, however, it necessitates an additional step of removing the solvent prior to use of the curing agent in aqueous systems where solvents are to be avoided. If the reaction is conducted in the presence of solvents, reaction temperatures may be higher than 100°C. and generally temperatures up to about 200°C. would be employed depending on the specific organic solvents employed. Illustrative solvents which may be used are ethanol, isopropanol, normal propanol, butanol, other alcohols or mixtures of alcohols and aromatic or aliphatic hydrocarbons such as petroleum ether, benzene, xylene, etc.

As noted earlier, the monomeric fatty compounds with which the active acrylic compound is reacted are known materials. The amino-amides of the monomeric fatty compounds are prepared by reaction of an amine component, generally a diamine or higher polyamine with a monomeric fatty compound. The conditions of reaction are well known and can be seen from the patents noted earlier. In general, this involves reaction at temperatures in the range of 100°C. to 300°C. for from 1 to 6 hours. In general, the amine component will be an alkylene/polyamine, as these are generally commonly available. Accordingly, the amine component may be represented by the general formula $$H_2N R' (NHR')_p NH_2$$

where $R'$ is an alkylene radical generally having from two to six carbon atoms and $p$ is a positive integer generally less than 6. Illustrative polyamines are diethylene triamine, triethylene tetramine, tetraethylene pentamine, di-1,3-propane triamine, tri-1,3-propane tetramine, di-1,2-propane triamine, bis(hexamethylene) triamine and the like. Thus, the alkylene radical in the above formula is generally ethylene but is not necessarily limited thereto.

The monomeric fatty compounds which are employed for preparing the amino-amides may be the naturally occurring higher (eight to 22 carbon atoms) fatty acids generally described as being monomeric aliphatic hydrocarbon monocarboxylic acids having from eight to 22 carbon atoms, and more desirably 16 to 20 carbon atoms. The lower alkyl esters (one to eight carbon atoms) thereof may be employed in place of the acids in which case, during the amidification reaction the by-product is an alcohol instead of water. The most commonly available fatty acids are those containing 18 carbon atoms, such as oleic and linoleic, mixtures of which are found in tall oil fatty acids in substantially equal amounts. Accordingly, tall oil fatty acids or the individual oleic and linoleic acids are usually employed. The fatty acids may be saturated or unsaturated.

Another monomeric fatty compound which may be used to prepare the amino-amides are the epoxidized fatty acids or their lower alkyl esters, which as earlier noted above are also known and available.

The preparation of amino-amides from low oxirane containing epoxidized fatty acids may be seen in U.S. Pat. No. 3,138,566. Higher viscosity amino-amides prepared from epoxidized materials may also be seen in Canadian Patent No. 616,324. In general, the epoxy fatty compounds may be prepared by any of the conventional well known methods for epoxidation. One method of forming the epoxidized material is to react any of the various unsaturated fatty acids with peracetic acid at about room temperature. The peracetic acid may be preformed before the epoxidation step or formed in situ by any of the well known processes, involving sulfonic acid resins, utilizing hydrogen peroxide and acetic acid. Epoxidation can also be performed by the use of formic acid and hydrogen peroxide or by the addition of hypochlorous acid to the carbon-carbon double bond followed by dehydrochlorination.

Another monomeric fatty compound which may be used in the present invention is a polycarboxylic fatty acid (or the lower alkyl ester thereof) prepared by addition of carbon monoxide to unsaturated higher fatty acids to provide a carboxylated higher fatty acid. Such monomeric fatty compounds and amino-amide resins therefrom may be seen in U.S. Pat. No. 3,062,773. As disclosed therein, there are various methods of preparing such carboxylic acids. One method is the addition of carbon monoxide and water in the presence of a suitable catalyst, such as nickel catalysts as shown in Reppe and Kroper, Ann. 582, 63 to 65 (1953). The reaction is generally carried out in the presence of nickel catalysts such as $Ni(CO)_4$ at temperatures about 270°C. and pressures of about 200 atmospheres. When unsaturated 18 carbon atom acids such as oleic acid is used as the starting material, the final product is a mixture of $C_{19}$ dicarboxylic acids. Because of some bond migration which occurs, the dicarboxylic acids will be a mixture of isomers of $C_{19}$ dicarboxylic acids. If polyunsaturated acids such as linoleic acids are used as a starting material, the resulting dicarboxylic acid mixture may contain unsaturated as well as saturated dicarboxylic acids.

As indicated, the amino-amide resins are prepared by reaction of the amine component with the monomeric fatty compound. These are generally prepared at reaction temperatures of about 100° to 300°C. Reaction at the lower temperatures will provide products which are substantially only amino-amides. At the higher reaction temperatures some imidazoline linkages may result such as shown in U.S. Pat. No. 2,966,478.

The amino-amide resins generally have relatively high amine numbers on the order of about 150 to 700 and preferably on the order of 300 to 600. This is generally achieved by reacting an excess of amine over the acid or oxirane present in the monomeric fatty compound. Thus the amine is added in sufficient amount to provide the desired amine number of the amine-amide resin.

As the presence of amine is necessary for curing of the epoxy resins, the product, after adduction with the active acrylic compound, will still have sufficient amine groups present in order to cure epoxy resin. The amine number will generally be lower for the adduct than was present in the amino-amide resin prior to adduction with the active acrylic compound. Generally the adducts will have amine numbers in the order of about 100 to 600 and more preferably be about 200 to 500.

As the curing agents are to be used in particular in aqueous epoxy resin systems thereby eliminating the necessity for use of any organic solvents the epoxy resin which may be used in this invention in aqueous form are the liquid epoxy resins. Such epoxy materials are of a wide variety. In general, they contain a plurality of epoxy groups capable of reaction with the curing agent. The typical initially available epoxy materials are complex reaction products of polyhydric phenols with polyfunctional halohydrins providing resins having terminal epoxide groups. A large number of this type of epoxy resins are disclosed in Greenlee U.S. Pat. Nos. 2,585,115 and 2,589,245. Typical polyhydric phenols useful in the preparation of epoxy resins include resorcinol and various bisphenols resulting from a condensation of phenol with aldehydes and ketones such as formaldehyde, acetaldehyde, acetone, methyl ethyl ketone, and the like. A typical epoxy resin is the reaction product of epichlorohydrin and 2,2-bis(parahydroxy phenyl) propane (Bisphenol A), the resin having the theoretical structural formula shown in U.S. Pat. No. 3,138,566 in which the integer n is 0 or a lower integer preferably one or less. As indicated in this patent, epoxy resins may be characterized further by reference to their epoxy equivalent weight, the epoxy equivalent weight of pure epoxy resins being the molecular weight of the resin divided by the mean number of epoxy radicals per molecule or in any case the number of grams of resin corresponding to one equivalent of epoxide. While certain specific epoxy resins which are the most readily available have been described, it is understood that the epoxy resinous compositions encompassed by this invention are those liquid epoxy resins having an epoxy equivalent weight of about 140 to 300, a preferred epoxy equivalent weight being about 185 to 220 expressed in terms of grams of compound per epoxy group. In general, epoxy resins having an epoxy equivalent weight above 300 are not suitable as such resins are solid in form. However, any fluid or liquid epoxy resin will be suitable.

This invention can best be illustrated by reference to the following Examples in which all parts and percentages are by weight unless otherwise noted.

EXAMPLE 1

The base resin for this example is an amino-amide of an epoxidized fatty acid. The resin was prepared by reacting at 350°F. (175°C.) for 3 hours the following reactants in the amounts indicated.

|  | Equivalents (eq.) | Weight % |
|---|---|---|
| Monomeric tall oil fatty acids | 0.249 | 25.4 |
| *Methylepoxy stearate (MES) | 0.35 | 40.6 |
| Triethylene tetramine (TETA) | 2.58 | 34.0 |

*Typical specification – 6.5 to 7.5 oxirane content

The resulting amino-amide resin had the following properties:

| Amine No. | 400 |
|---|---|
| Acid No. | 2.6 |
| Viscosity at 25° | 1600 poise |

The temperature was reduced from 350°F. to 150°F. (65°C.) and water added to provide a mixture of 65.0 parts resin and 38.8 parts water. To this was added 7 parts of acrylic acid and the mixture was then heated for 5 hours at 150°F.

The resulting product had the following analysis:

| Amine No. | 237 |
|---|---|
| Acid No. | 46 |
| Gardner color 130°F. | 5 |
| Viscosity 25°C. | 217 poise |
| % Solids | 65 |

EXAMPLES 2-14

In the same manner as Example 1, the base resin was reacted with varying amounts of different active acrylic compounds. The results are as follows:

Table I

| No. | Adducting Agent | Parts by Weight | Moles per Equivalent of Amine | Amine No. | Acid No. |
|---|---|---|---|---|---|
| 1 | Acrylic Acid | 7 | 0.206 | 237 | 46 |
| 2 | Acrylic Acid | 10 | 0.296 | 226 | 65 |
| 3 | Acrylic Acid | 5 | 0.149 | 246 | 33 |
| 4 | Methacrylic Acid | 10 | 0.247 | 219 | 56 |
| 5 | Methacrylic Acid | 7 | 0.172 | 233 | 39 |
| 6 | Methacrylic Acid | 5 | 0.123 | 242 | 28 |
| 7 | Methyl Methacrylate | 10 | 0.213 | 214 | 38,44 |
| 8 | Methyl Methacrylate | 7 | 0.149 | 230 | 29 |
| 9 | Methyl Methacrylate | 5 | 0.106 | 242 | 21 |
| 10 | Maleic Acid | 7 | 0.128 | 218 | 51 |
| 11 | Maleic Acid | 5 | 0.092 | 231 | 36 |
| 12 | Maleic Anhydride | 10 | 0.217 | 175 | 63 |
| 13 | Maleic Anhydride | 7 | 0.152 | 202 | 44 |
| 14 | Maleic Anhydride | 5 | 0.108 | 220 | 31 |

EXAMPLES 15-26

In the same manner as in Example 1, adducts were prepared using different base resins. The base resins were prepared from the following reactants indicated and with the resulting properties indicated.

|  | Resin X (eq.) | Resin Y (eq.) |
| --- | --- | --- |
| Monomeric Tall Oil Fatty Acids | 1.0 | 0.249 |
| MES | 0 | 0.0923 |
| Tetraethylene Pentamine (TEPA) | 4.5 | 2.58 |
| Amine No. | 450 | 600 |
| Viscosity at 25°C. (poises) | 5 | 18 |

The foregoing base resins were then adducted with an active acrylic compound in the same manner as Example 1, using a 65 percent solids concentration of base resin in water. The details and results thereof can be seen from the following table.

TABLE II

| Ex. | Base Resin | Adducting Agent | Amount (phr.) | Amine No. | Acid No. |
| --- | --- | --- | --- | --- | --- |
| 15 | X | Maleic Anhydride | 5 | 281.5 | 30.6 |
| 16 | X | do. | 10 | 238.2 | 49.8 |
| 17 | X | do. | 20 | 145.6 | 114.8 |
| 18 | X | Acrylic Acid | 5 | 261.0 | 34.6 |
| 19 | X | do. | 10 | 241.8 | 64.6 |
| 20 | X | do. | 20 | 228.4 | 105.9 |
| 21 | Y | Maleic Anhydride | 5 | 341.2 | 14.0 |
| 22 | Y | do. | 10 | 290.1 | 23.2 |
| 23 | Y | do. | 20 | 231.0 | 56.2 |
| 24 | Y | Acrylic Acid | 5 | 378.0 | 40.35 |
| 25 | Y | do. | 10 | 347.55 | 62.1 |
| 26 | Y | do. | 20 | 317.8 | 109.0 |

EXAMPLE 27

An amino-amide of heptadecane dicarboxylic acid was prepared in substantially the same manner as in Example III of U.S. Pat. No. 3,062,773. In this instance, the reaction was conducted at 205°C. for 5 hours, the last 2 to 3 hours being under vacuum (75 to 150 mm Hg) 2027.9 grams (12.29 eq.) of heptadecane dicarboxylic acid and 1289.8 grams (32.57 eq.) of triethylene tetramine. The product, on amber liquid had an acid number of 0.7, an amine number of 376 and a viscosity of 128 poises at 75°C. The product was completely soluble in water at 50 to 100 percent solids and the 65 percent aqueous solution had a viscosity of 222 poises at 25°C.

EXAMPLE 28

In a similar manner, the amino-amide containing imidazoline groups were prepared similar to that disclosed in Example I of U.S. Pat. No. 2,966,478. In this instance, reaction was at 300°C. for 2 hours and 1 hour at 200°C. with the application of vacuum (125 mm hg). The product, on amber liquid, had an acid value of 0.2, an amine number of 550 and a viscosity of 87 poises at 25°C. The product was completely soluble in water at 65 percent solids and the aqueous solution had a viscosity of 28 poises at 25°C.

EXAMPLE 29

In the same manner as Example 1, heating for 5 hours at 150°F., the acrylic adducts of the products of Examples 27 and 28 were prepared. The charges and resultant resin solution properties are shown below:

| Charge | Amine No. | Acid No. |
| --- | --- | --- |
| A. 65 parts by weight (pbw) Ex. 27 resin<br>10 pbw acrylic acid<br>40.4 pbw water | 205 | 69 |
| B. 65 pbw Ex. 28 resin<br>10 pbw acrylic acid<br>40.4 pbw water | 289 | 73 |

EXAMPLE 30

Some of the foregoing adducts were then formulated for coatings application. The paint formulations, preparative procedures and evaluation of the coating may be run from the following.

A. Formulation

A simple equal volume gloss enamel paint formulation was used for evaluation purposes. The epoxy to curing agent ratios employed were substantially 50:50 and 60:40 by weight. Water was added or subtracted to maintain substantially equal volume mixing. The formulations are as set forth below:

1. 50:50 epoxy resin to curing agent ratio.

(1) 50:50 epoxy resin to curing agent ratio:

| Epoxy component materials | Pounds | Gallons |
| --- | --- | --- |
| 50% solids preformulated epoxy emulsion* | 267 | 30.5 |
| Water | 107 | 12.7 |
| Total | 374 | 43.2 |

| Curing agent component epoxy component materials | Pounds | Gallons |
| --- | --- | --- |
| Curing agent at 65% solids | 200.0 | 23.2 |
| TiO₂ (R-901) | 210.0 | 6.0 |
| Water | 115.0 | 14.0 |
| Total | 525.0 | 43.2 |

| | |
| --- | --- |
| Volume solids | 43.4 |
| Weight solids | 53.1 |
| Pounds TiO₂/per gallon | 3.0 |

(2) 60:40 epoxy resin to curing agent ratio:

| Epoxy component materials | Pounds | Gallons |
| --- | --- | --- |
| 50% solids preformulated epoxy emulsion* | 400.0 | 45.5 |
| Total | 400.0 | 45.5 |

| Curing agent component materials | Pounds | Gallons |
| --- | --- | --- |
| Curing agent at 65% solids | 200.0 | 23.2 |
| TiO₂(R-901) | 270.0 | 7.8 |
| Water | 120.0 | 14.5 |
| Total | 590.0 | 45.5 |

| | |
|---|---|
| Volume solds | 51.2 |
| Weight solids | 61.5 |
| Pounds TiO$_2$/per gallon | 3.0 |

*See the following table:

| Item | Percent by weight |
|---|---|
| Water | 48.0 |
| $C_9H_{19}$—⬡—$O(CH_2CH_2O)_{39}CH_2CH_2OH$ | 1.7 |
| Hydroxymethyl cellulose | 0.3 |
| Epoxy resin (a mixture of 79.4% of diglycidyl ether of bisphenol A having an epoxy equivalent weight of 190, 14% of an epoxidized aliphatic hydrocarbon mixture (12–14 carbon atoms) having an epoxy equivalent weight of 225 and 7% of polyoxyethylene (20) sorbitan monolaurate) | 50.0 |
| Added: | |
| Biocide (benzyl bromoacetate) | .02 |
| Crystallization inhibitor (2-amino-ethyl propanediol) | .03 |

B. Preparation

On high shear mixing equipment (a Cowles dissolver) complete the following steps.

1. Add TiO$_2$ to curing agent and disperse at 1,500 to 2,000 revolutions per minute (rpm) until >.5 mil grind.
2. Reduce rpm's to 1,000 and add water.

C. Coating Evaluations

The following tables describe coating physical-chemical properties obtained with various curing agents.

1. Chemical Resistance*

| Curing Agent | 10% HCL | 5% HNO$_3$ | 10% H$_2$SO$_4$ | 5% N$_a$OH | 10% HAC | Xylene |
|---|---|---|---|---|---|---|
| No. 1 using 50:50 paint formula | >3 hrs. ne | >3 hrs. ne | >3 hrs. ne | >3 hrs. ne* | 70 min. ss | 60 min. ss |
| No. 1 using 60:40 paint formula | >3 hrs. ne | >3 hrs. ne | >3 hrs. ne | >3 hrs. ne | 115 min. ss | 120 min. ss |
| No. 4 using 50:50 paint formula | >3 hrs. ne | >3 hrs. ne | >3 hrs. ne | >3 hrs. ne | 50 min. ss | 45 min. ss |
| No. 4 using 60:40 paint formula | >3 hrs. ne | >3 hrs. ne | >3 hrs. ne | >3 hrs. ne | 120 min. ss | 120 min. ss |

*Paints cured 10 days 25°C., 50 % relative humidity

2. Physical Properties

| Curing Agent | Brush Out 1 Hr. | 3 Hr. | 5 Hr. | 60° Gardner Glass 1 Hr. | 3 Mil Draw Down 3 Hr. | 5 Hr. |
|---|---|---|---|---|---|---|
| No. 1 using 50:50 paint formula | 90 pts. | 89 pts. | 90 pts. | 94 pts. | 93 pts. | 95 pts. |
| No. 1 using 60:40 paint formula | 89 do. | 92 do. | 91 do. | 90 do. | 86 do. | 89 do. |
| No. 4 using 50:50 paint formula | 91 do. | 92 do. | 92 do. | 89 do. | 92 do. | 94 do. |
| No. 4 using 60:40 paint formula | 87 do. | 84 do. | 89 do. | 91 do. | 94 do. | 95 do. |
| No. 5 using 50:50 paint formula | 85 do. | 83 do. | 89 do. | 91 do. | 94 do. | 92 do. |
| No. 5 using 60:40 paint formula | 84 do. | 81 do. | 83 do. | 89 do. | 87 do. | 88 do. |
| No. 7 using 50:50 paint formula | 90 do. | 91 do. | 93 do. | 91 do. | 93 do. | 94 do. |
| No. 7 using 60:40 paint formula | 85 do. | 86 do. | 83 do. | 82 do. | 82 do. | 85 do. |
| No. 12 using 50:50 paint formula | 91 do. | 91 do. | 90 do. | 89 do. | 92 do. | 94 do. |
| No. 12 using 60:40 paint formula | 81 do. | 85 do. | 84 do. | 80 do. | 79 do. | 79 do. |

Table — Continued

2. Physical Properties

| Curing Agent | Brush Out 1 Hr. | 3 Hr. | 5 Hr. | 60° Gardner Glass 1 Hr. | 3 Mil Draw Down 3 Hr. | 5 Hr. |
|---|---|---|---|---|---|---|
| No. 13 using 50:50 paint formula | 90 do. | 89 do. | 90 do. | 89 do. | 91 do. | 92 do. |
| No. 13 using 60:40 paint formula | 85 do. | 81 do. | 84 do. | 90 do. | 90 do. | 87 do. |
| No. 14 using 60:50 paint formula | 85 do. | 86 do. | 69 do. | 81 do. | 76 do. | 67 do. |
| No. 14 using 60:40 paint formula | 75 do. | 71 do. | 50 do. | 71 do. | 69 do. | 43 do. |

Amine type epoxy resin curing agents react with carbon dioxide to form a surface haze generally referred to as amine carbonate formation. Generally additional organic solvent or surfactant is required to maintain gloss in existing water based epoxy emulsion coatings.

EXAMPLE 31

An experiment was conducted to compare amine carbonate formation on various curing agents. Three mil films of each curing agent diluted at various levels with water were exposed to the carbon dioxide in air. The following table outlines the results.

TABLE III

| Curing Agent | Amount of Water Added | Amine Carbonate Formation 24 hours | 7 days | 30 days |
|---|---|---|---|---|
| No. 1 | None | None | None | None |
| No. 1 | 10 Wt. % | None | None | None |
| No. 1 | 50 Wt. % | None | None | None |

TABLE III-Continued

| Curing Agent | Amount of Water Added | Amine Carbonate Formation 24 hours | 7 days | 30 days |
|---|---|---|---|---|
| Base Resin Y | None | Heavy | Heavy | Heavy |
| Base Resin X | None | Heavy | Heavy | Heavy |
| No. 16 | None | None | None | None |
| No. 16 | 10 Wt. % | None | None | Slight |
| No. 16 | 50 Wt. % | None | Slight | Slight |
| No. 20 | None | None | None | None |
| No. 20 | 10 Wt. % | None | None | None |
| No. 20 | 50 Wt. % | None | None | None |

The embodiments of the invention in which an exclusive property or privilege is claimed are defined as follows:

1. An adduct particularly suitable for curing epoxy resins in aqueous systems of an active acrylic compound and an amino-amide of a monomeric fatty compound, said monomeric fatty compound being selected from the group consisting of higher fatty acids, epoxidized higher fatty acids and a carboxylated higher fatty acid wherein said higher fatty acid contains from eight to 22 carbon atoms, said active acrylic compound having the formula

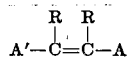

where R is hydrogen or an alkyl group containing from one to eight carbon atoms, A is COOR and A' is selected from the group consisting of A and R, said active acrylic compound being employed in an amount of about 0.04 to 0.4 moles per equivalent of amine in said amino amide, said amino-amide prior to adduction having an amine number of about 150 to 700.

2. An adduct as defined in claim 1 in which said higher fatty acid contains 18 carbon atoms.

3. An adduct as defined in claim 1 in which said acrylic compound is selected from the group consisting of acrylic acid, methacrylic acid, methyl methacrylate maleic acid and maleic anhydride.

4. An adduct as defined in claim 1 in which the amount of said active acrylic compound is about 0.1 to 0.3 moles of active acrylic compound per equivalent of amine in said amino-amide, said amino-amide prior to adduction having an amine number of about 300 to 600.

5. An adduct as defined in claim 4 wherein said adduct has an amine number of about 100 to 600.

6. A cured composition of matter comprising the reaction product of the adduct defined in claim 1 and a liquid epoxy resin having an epoxy equivalent weight of about 140 to 300.

7. A cured composition as defined in claim 6 in which said epoxy resin is a polyglycidyl ether of a polyhydric phenol.

8. A cured composition as defined in claim 7 in which said polyhydric phenol is 2,2-bis(parahydroxy phenyl) propane.

* * * * *

PO-1050 (5/69)

UNITED STATES PATENT OFFICE
CERTIFICATE OF CORRECTION

Patent No. 3,816,366      Dated June 11, 1974

Inventor(s) Michael A. Laudise

It is certified that error appears in the above-identified patent and that said Letters Patent are hereby corrected as shown below:

Column 2, line 63, after "per" insert -- equivalent --

Column 2, line 64, after "amino-amide" delete -- By --

Column 5, line 3, "amine" (second occurance) should be -- amino --

Column 6, line 25, between "7.5 and oxirane" insert -- % --

Column 10, after the table entitled "1. Chemical Resistance" and before the table entitled "2. Physical Properties" insert -- ** No effect
*** Slight softening --

Signed and sealed this 5th day of November 1974.

(SEAL)
Attest:

McCOY M. GIBSON JR.
Attesting Officer

C. MARSHALL DANN
Commissioner of Patents